April 2, 1968 M. B. THORNTON 3,376,048
TRAILER DOLLY LIFT SYSTEM

Filed June 1, 1965 3 Sheets-Sheet 1

INVENTOR
MARSHALL B. THORNTON
BY
ATTORNEY

FIG_2

April 2, 1968  M. B. THORNTON  3,376,048
TRAILER DOLLY LIFT SYSTEM
Filed June 1, 1965  3 Sheets-Sheet 3
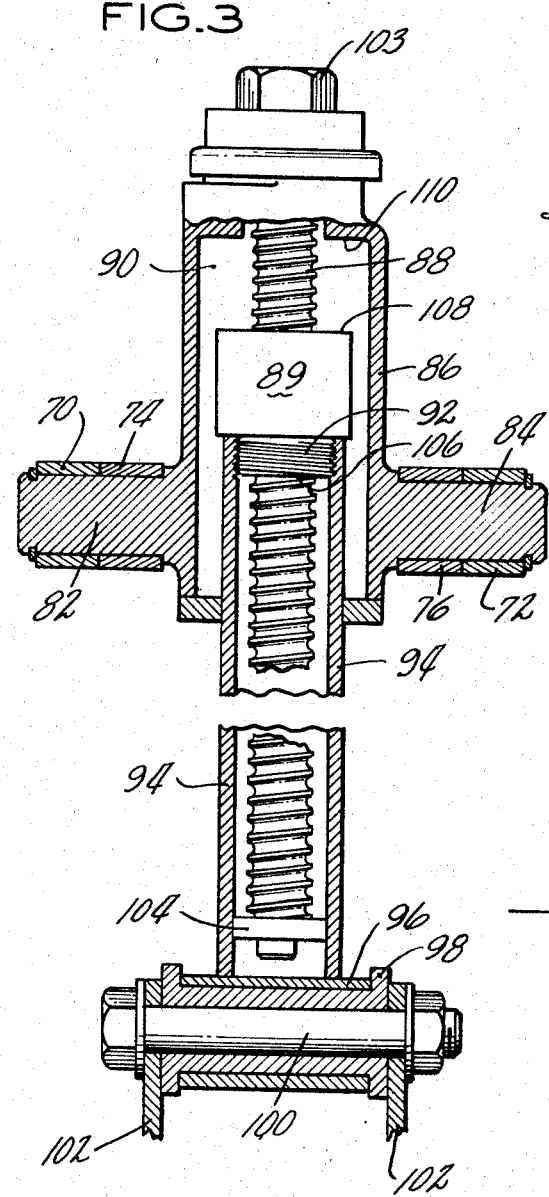
FIG. 3
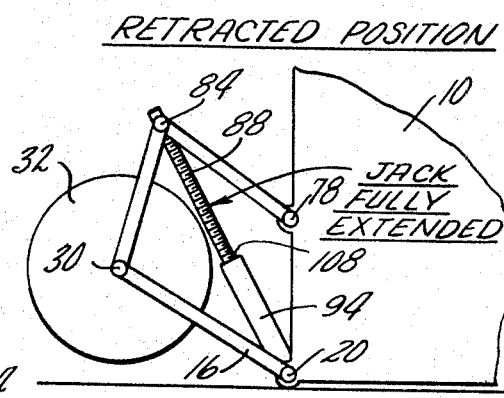
FIG. 4 — RETRACTED POSITION — JACK FULLY EXTENDED
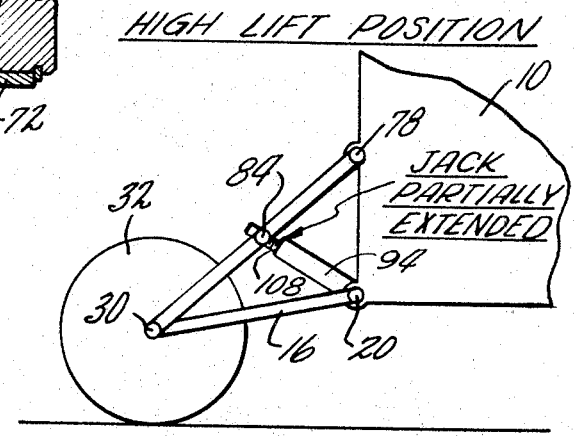
FIG. 5 — HIGH LIFT POSITION — JACK PARTIALLY EXTENDED
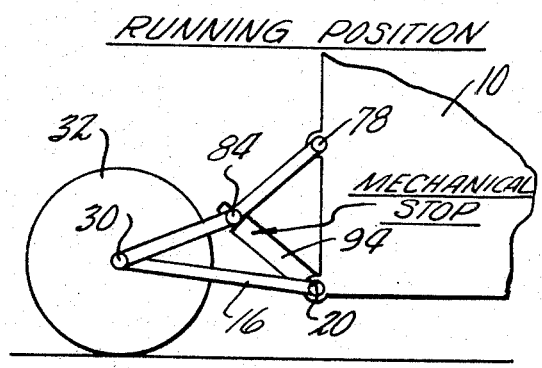
FIG. 6 — RUNNING POSITION — MECHANICAL STOP
INVENTOR
MARSHALL B. THORNTON
BY M. B. Tasker
ATTORNEY

United States Patent Office 3,376,048
Patented Apr. 2, 1968

3,376,048
TRAILER DOLLY LIFT SYSTEM
Marshall B. Thornton, Granby, Conn., assignor to United Aircraft Corporation, East Hartford, Conn., a corporation of Delaware
Filed June 1, 1965, Ser. No. 460,015
2 Claims. (Cl. 280—43.2)

ABSTRACT OF THE DISCLOSURE

Front and rear detachable trailer dollies are provided, each having jack operated toggle mechanism for lifting the trailer and supporting it in running position, the jack for each mechanism being connected at one of its ends to the dolly frame and at its other end to the common pivot for the links comprising the toggle. Running loads are taken by the dolly carried jack member which directly engages the toggle at its common pivot point as the toggle moves into an over-center position.

---

This invention relates to jacking and load supporting mechanism for detachable trailer dollies.

It is an object of this invention to provide a mechanism of this type which is self-locking in the load carrying, or running, position and in which all running loads are taken through solid structural members rather than through the lifting members of the jacks.

Another object of this invention is to provide improved lifting and supporting mechanism having a high-elevation position for the load intermediate the running position and the load down position of the mechanism for providing ramp loading clearance for the load.

A further object of the invention is the provision of a jack operated toggle mechanism for the load lifting and supporting means in which an extensible jack member is pivotally connected and applies its force at the common pivot point of the toggle links comprising the toggle mechanism.

A further object of the invention is generally to improve jacking and load supporting mechanism for trailer dollies.

These and other objects and advantages of the invention will become evident or will be pointed out in connection with the following detailed description of a preferred embodiment of the invention shown in the accompanying drawings.

In these drawings:

FIG. 3 is a longitudinal section through a jack; and

FIGS. 4, 5 and 6 illustrate diagrammatically three different positions of the jacking and supporting structure of the invention.

Figure 1:
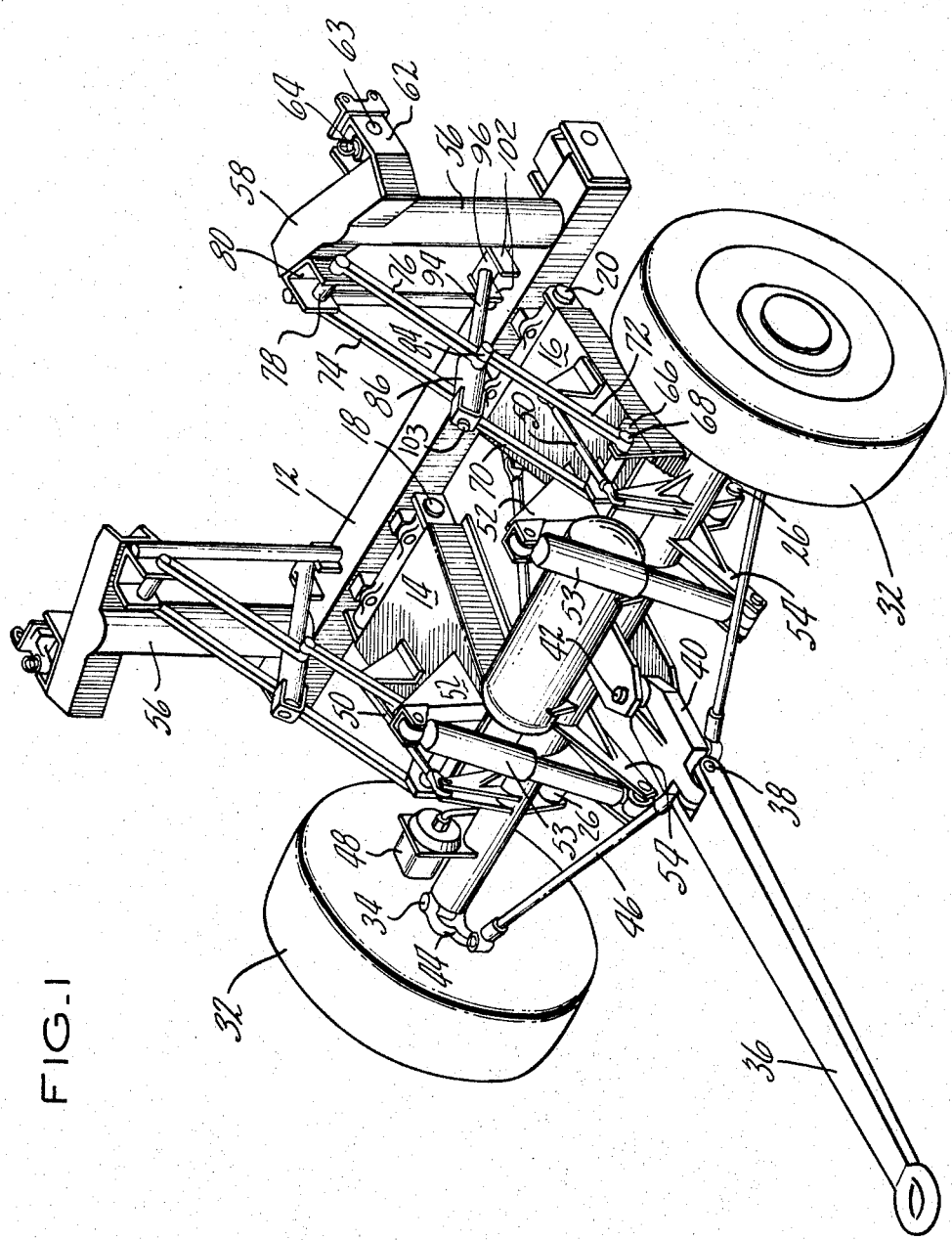
FIG. 1 is a perspective view of the front dolly of a front and rear set of dollies which are adapted to be detachably connected to front and rear ends respectively of a trailer body to lift and transport the same.
Figure 2:
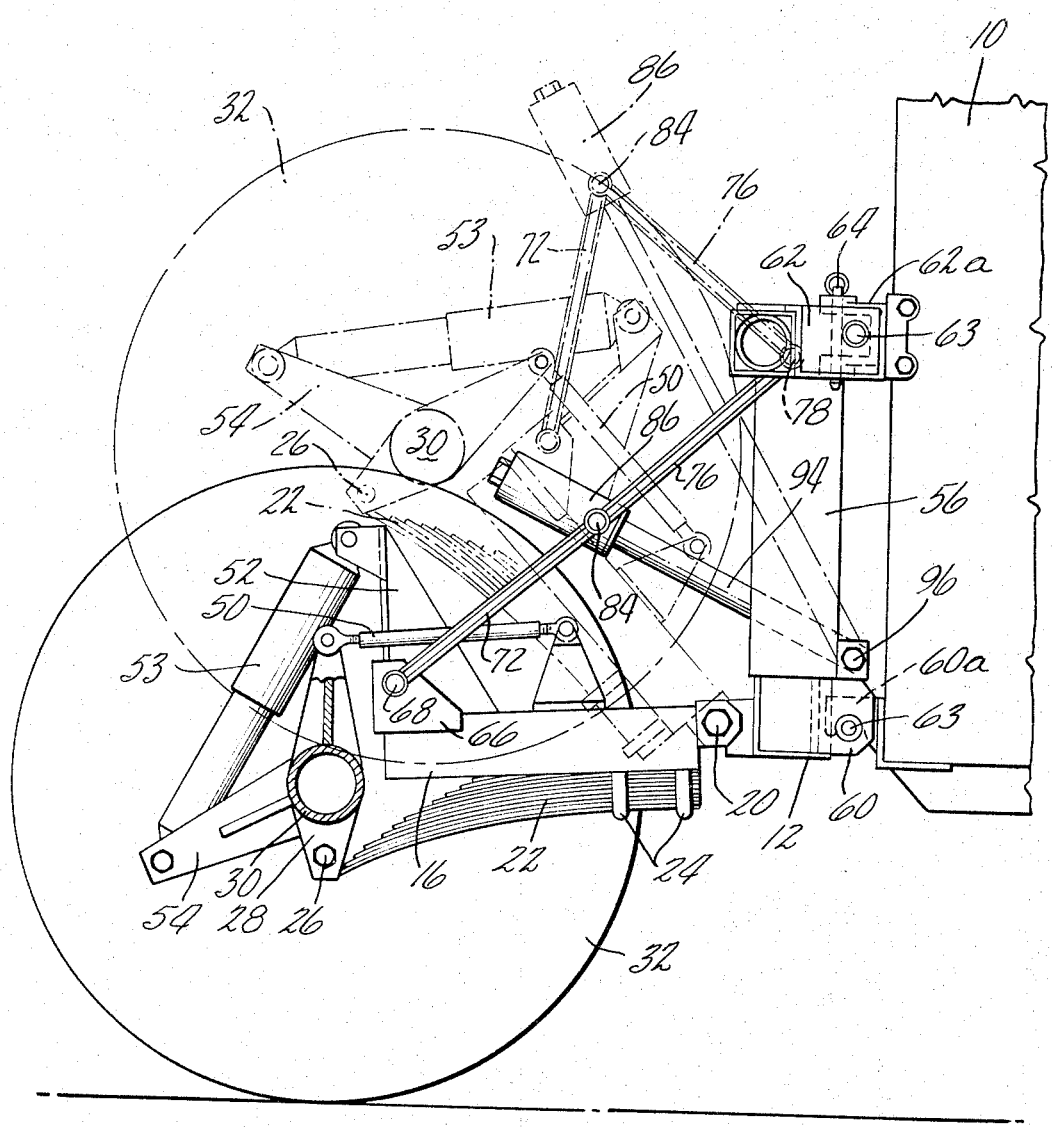
FIG. 2 is a side elevation of the rear dolly.

Referring to FIGS. 1 and 2, the trailer body is shown at 10 in FIG. 2 and front and rear wheeled lifting and supporting dollies are shown in FIGS. 1 and 2, respectively, for lifting and transporting the trailer body. The front and rear dollies are identical as far as the lifting and supporting mechanism of this invention is concerned, the principal difference between them being in the tongue for drawing the front dolly and the steering means provided for the wheels of the front dolly. The wheels of the rear dolly are freely rotatable on a fixed axle of the dolly and are not steerable. Due to the similarity of the lifting and supporting mechanism of the front and rear dollies, only the front dolly of FIG. 1 will be described in detail. Like numbers on like parts appear in FIG. 2. The front dolly of FIG. 1 includes a transverse beam 12 at the rear of the dolly and a pair of left and right-hand A-frames 14 and 16 which are pivoted to the beam at their bases on A-frame shafts 18 and 20. The A-frames have depending side flanges to provide a channel-shaped cross section and within each channel a cantilever spring is fixedly secured at its base by U-bolts 24 (FIG. 2). The springs extend forwardly and at their free ends are pivoted by shackle bolts 26 to a pair of depending ears 28 which are welded to a dead axle 30. Axle 30 carries wheels 32 at its opposite ends mounted on king pins 34 about which they are free to turn through a limited angle to permit the wheels to be steered by a tongue 36 by which the trailer is towed. The tongue is pivoted at 38 to a link 40 which in turn is pivoted at its rear end to the axle on a pin 42. Link 40 is connected to steering arms 44 on the wheels by steering tie rods 46 in a usual manner.

The wheels are provided with usual hydraulic brakes, here identified by the hydraulic cylinders 48 in FIG. 1. Brake reaction rods 50 are provided between the axle and each A-frame just above each spring 22. Each A-frame has a rigid upstanding frame member 52 which is pivoted to one end of a shock absorber 53, the other end of which is pivoted to a rigid arm 54 projecting from the axle.

The box beam 12 carries an upstanding reaction post 56 at each end and a transverse reaction beam 58. A lower attachment fitting 60 is provided at each end of beam 12 and an upper attachment fitting 62 is provided at the outer end of each reaction beam 58 by means of which the dolly is detachably connected to the trailer body, as illustrated in FIG. 2. Here it will be noted that the trailer body is provided with cooperating lower and upper fittings 60a and 62a. Fittings 60 and 62 include horizontal pins 63. The pins of fittings 60 are automatically engaged with hooks on fittings 60a as beam 12 is raised relative to the stationary trailer body. A vertical pin 64 which passes through fitting 62a in front of pin 63 detachably secures the upper fittings 62 and 62a together. It will thus be evident that when A-frames 14 and 16 are in the generally horizontal position shown in FIGS. 1 and 2 the wheels 32 are engaging the ground and the trailer body is elevated above the ground in position to be transported over the ground on wheels 32.

When, however, the A-frames are swung clockwise about their shafts 18 and 20 into the dotted positions shown in FIG. 2, the trailer body is lowered so as to rest on the ground and the wheels 32 are raised off the ground.

The present invention is concerned with the mechanism which swings the A-frames 14 and 16 and the wheeled structure carried thereby between the two positions shown in full and dotted lines in FIG. 2. This mechanism consists essentially of toggle linkage at each end of beam 12, each having a jack for actuating the linkage. Since the toggle linkage and jack mechanism is identical at opposite ends of the beam, only the mechanism associated with A-frame 16 and reaction beam 58 at the right-hand end of FIG. 1 will be described in detail.

As shown most clearly in FIG. 1, A-frame 16 has, at its free end, a pair of upstanding ears 66 through which a pivot pin 68 extends and on which the ends of a pair of toggle links 70, 72 are pivoted. These links are spaced apart by the ears 66. The cooperating links 74, 76 of the toggles are pivoted on a pin 78 which is supported on a pair of ears on a bracket 80 secured to the inner end of reaction beam 58. The toggle links are connected at their adjacent ends by trunnions 82, 84 (FIG. 3) on a trunnion block 86.

The trunnion block has one end of a ball screw 88 journalled in its upper end in a thrust bearing (not shown). Screw 88 is threaded through a ball nut 89 in chamber 90 in the trunnion block. Ball nut 89 is attached by means of a threaded boss 92 to a screw housing 94 which extends through trunnion block 86 at the lower end of chamber 90. The lower end of housing 94 carries a sleeve 96 which together with a rubber bushing 98 is pivoted on a bolt 100 mounted in a pair of attaching ears 102 on the top of box beam 12.

The upper end of screw 88 extends through trunnion block 86 and has a hexagonal end 103 adapted to receive a handle (not shown) for rotating the screw manually. The lower end of screw 88 has a positive stop 104 which engages the end 106 of threaded boss 92 when the screw is fully extended. At the other end of its axial travel, screw 88 is stopped by the engagement of the upper end surface 108 of ball nut 89 with the upper surface 110 of chamber 90 of the trunnion block 86 for a purpose to be hereinafter explained in detail.

When it is desired to transport the trailer body 10, the front and rear dollies are wheeled into position at the front and rear ends of the body and the jacks are operated by turning the hexagonal ends 103 of jack screws 88 sufficiently to bring pins 63 of fittings 60 into engagement with the hooks of fittings 60a and pins 63 of fittings 62 into the channels of fittings 62a. Pins 64 are then inserted to secure the dollies to the body 10.

As the jack screws 88 are rotated to thread the screws 88 into ball nuts 89 at the upper end of screw housings 94, the toggles are gradually straightened which results in swinging the A-frames 14, 16 counterclockwise about their pivot shafts 18 and 20 to tend to lower the wheels 32. As the wheels are in engagement with the ground, the result is to move A-frames 14 and 16 counterclockwise about the wheel axis 30 and raise body 10 off the ground. This action is shown most clearly in FIGS. 4, 5 and 6. As the trunnions 84, which in these diagrammatic figures represent the trunnion block, advance toward the upper end 108 of the screw housing 94, the A-frames move counterclockwise about their pivots 18 and 20 until the wheels 32 engage the ground. Thereafter, as the toggles straighten, the A-frames move counterclockwise about axle 30 and trailer body 10 is elevated into the position shown in FIG. 5 in which the toggles are in an on-center position wherein their pivot points are aligned. This provides the point of maximum lift for the body 10.

In accordance with this invention, the toggle links are so arranged that the trunnions 84 can move beyond the toggle on-center position into an over-center position shown in FIG. 6. In this position, as diagrammatically shown, the trunnions 84 engage the surface 108 at the end of the screw housing 94. In the actual construction shown in FIGS. 1 and 3, the surface 108 is the upper end of the ball nut which is carried by screw housing 94 and this surface engages the surface 110 at the upper end of chamber 90 of trunnion block 86.

When the jack is in the fully retracted position above described in which the toggles are slightly over-center there is a slight force coincident to the jack axis. This force is taken directly through the trunnion block and the screw housing 94, both solid members, thus relieving the jack screw members of any of the forces resulting from the running operations. Further with the toggles in their over-center positions and resting against a solid structural stop member the lifting and supporting mechanism is locked against movement.

As the screw 88 is rotated by the jack handle in a lowering direction, the toggle is first straightened into the FIG. 5 position in which the body 10 is raised above its FIG. 6 running position. This high-level position is useful when it is required to move the body 10 onto a level surface at the end of a steep ramp, as in loading it onto an airplane, enabling the trailer body to clear the top of the ramp. As the toggles reach the FIG. 4 position in which the screw 88 is fully extended from screw housing 94, the positive stop 104 engages the lower end 106 of threaded boss 92 to provide a limit stop and prevent further extending movement of the jack.

It will be evident that as a result of this invention a lifting and supporting mechanism has been provided which is self-locking in the normal loaded, or running, position of the dollies and also one in which any axial load on the jack screw in the running position is transferred to a positive mechanical stop.

It will be further evident that a very useful high-lift position of the trailer body has been provided by this mechanism which enables the trailer dollies to be ramped under conditions heretofore impossible with such a mechanism.

While only one embodiment of the invention has been shown and described herein, it will be understood that many changes may be made in the construction and arrangement of the various parts without exceeding the scope of the invention as defined by the appended claims.

I claim:

1. A detachable wheeled dolly for lifting and supporting a trailer body unit for movement over a ground surface, said dolly including a transverse beam having an upstanding reaction post at each end, a frame at each end of said beam having one end pivoted on said beam, an axle supported from the free ends of said frames having ground engageable wheels at its opposite ends, pairs of toggle links, said toggle links having their adjacent ends pivotally connected and having one of their remote ends pivoted to the free ends of said frames, said links having their other remote ends pivotally connected to said reaction posts adjacent the upper ends thereof, a jack for each pair of toggle links having inner and outer telescoping members, said outer member being pivotally connected to said beam and said inner member being pivotally connected to the common pivotal connection of said toggle links, said inner jack member having a block on its free end, and said outer jack member having an abutment fixed to its free end through which said inner jack member is axially movable and which engages said block in the overcenter position of the toggle in which the trailer body is supported on said wheels.

2. A wheeled dolly for lifting and supporting a trailer body unit for movement over a ground surface, said dolly including a transverse beam having an upstanding reaction post at each end, cooperating attachment fittings on said beam and on said body, cooperating attachment fittings on the upper ends of said reaction posts and on said body, a pair of forwardly extending frames pivoted at their rear ends on said beam, an axle supported from the free ends of said frames having ground engageable wheels at its opposite ends, and means for swinging said frames about their pivots including a toggle associated with each frame and a jack having extensible telescoping members associated with each toggle, said toggles each including two toggle links pivotally connected at their adjacent ends to form a toggle joint and having their remote ends pivotally connected to one of said frames and to the upper end of one of said reaction posts, and said jack having one of its telescoping members connected at its free end to one of said toggle joints and the other member pivotally connected at its free end to said beam, the outer telescopic member of said jack having an abutment fixed to the free end thereof through which the inner telescopic member is extended, said inner jack member including a block on the free end thereof, said block having a chamber in which said abutment is received, said abutment forming a support for engagement by the adjacent wall of said chamber in the fully retracted position of said inner jack member for locking said toggle in a slightly over-center position.

References Cited

UNITED STATES PATENTS

| | | | |
|---|---|---|---|
| 897,827 | 9/1908 | Goble | 254—126 |
| 1,638,859 | 8/1927 | Knowles | 254—126 |
| 2,968,490 | 1/1961 | Baus | 280—35 |
| 3,135,401 | 6/1964 | Schramm | 280—43.23 X |
| 3,189,363 | 6/1965 | Pierrat | 280—35 |
| 3,243,193 | 3/1966 | Fulmer et al. | 280—35 |

RICHARD J. JOHNSON, *Primary Examiner.*

BENJAMIN HERSH, *Examiner.*

C. C. PARSONS, R. SONG, *Assistant Examiners.*